United States Patent
Oomen et al.

(10) Patent No.: US 11,267,380 B2
(45) Date of Patent: Mar. 8, 2022

(54) SUSPENSION FABRIC SEAT HEATING SYSTEM

(71) Applicant: Illinois Tool Works Inc., Glenview, IL (US)

(72) Inventors: Craig Martin Oomen, Lowell, MI (US); Randy James Sayers, Howard City, MI (US); Samuel Smith, Allendale, MI (US); Manfred Mueller, Nuremberg (DE)

(73) Assignee: Illinois Tool Works Inc., Glenview, IL (US)

(*) Notice: Subject to any disclaimer, the term of this patent is extended or adjusted under 35 U.S.C. 154(b) by 120 days.

(21) Appl. No.: 16/529,445

(22) Filed: Aug. 1, 2019

(65) Prior Publication Data

US 2020/0039399 A1 Feb. 6, 2020

Related U.S. Application Data

(60) Provisional application No. 62/714,173, filed on Aug. 3, 2018.

(51) Int. Cl.
| | |
|---|---|
| *B60N 2/56* | (2006.01) |
| *H05B 3/34* | (2006.01) |
| *H05B 3/38* | (2006.01) |
| *H05B 3/14* | (2006.01) |

(52) U.S. Cl.
CPC ............ *B60N 2/5685* (2013.01); *H05B 3/146* (2013.01); *H05B 3/347* (2013.01); *H05B 3/38* (2013.01)

(58) Field of Classification Search
CPC .. B60N 2/5685; B60N 2/5891; B60N 2/7011; B60N 2/58; B60N 2/7017; H05B 3/347; H05B 3/38; H05B 3/146; H05B 2203/014; H05B 3/145; H05B 2214/04; H05B 2203/029; H05B 3/34; H05B 3/342; H05B 3/345; H05B 3/36; A47C 7/282; A47C 7/72; A47C 21/04; A47C 7/748; B29C 45/14336; B29C 45/14786
See application file for complete search history.

(56) References Cited

U.S. PATENT DOCUMENTS

| | | | |
|---|---|---|---|
| 4,044,221 A | 8/1977 | Kuhn | |
| 4,575,620 A * | 3/1986 | Ishii | H05B 3/56 174/107 |
| 6,035,901 A * | 3/2000 | Stumpf | A47C 5/06 139/419 |

(Continued)

FOREIGN PATENT DOCUMENTS

| | | | | |
|---|---|---|---|---|
| CN | 203780371 U | * | 8/2014 | |
| WO | WO-2006014577 A2 | * | 2/2006 | ......... A47C 1/03272 |

OTHER PUBLICATIONS

International Search Report and Written Opinion issued by ISA/EPO in connection with PCT/US2019/044806 dated Dec. 2, 2019.

*Primary Examiner* — David E Allred
(74) *Attorney, Agent, or Firm* — Quarles & Brady LLP

(57) ABSTRACT

A suspension fabric seat includes a fabric seat surface formed from a woven fabric material having heating element fibers. The heating element fibers are in electrical communication with a conductor. A carrier is overmolded onto the seat surface. The carrier and the conductor are disposed in a frame and a connector is mounted to the frame in electrical communication with the conductor.

20 Claims, 6 Drawing Sheets

(56) References Cited

U.S. PATENT DOCUMENTS

| | | | |
|---|---|---|---|
| 6,540,950 B1* | 4/2003 | Coffield | A47C 7/282 |
| | | | 156/245 |
| 8,329,281 B2 | 12/2012 | Coffield | |
| 8,857,033 B2 | 10/2014 | Coffield et al. | |
| 9,156,211 B2 | 10/2015 | Coffield | |
| 2004/0004070 A1* | 1/2004 | Sullivan | H05B 3/36 |
| | | | 219/494 |
| 2006/0255645 A1* | 11/2006 | Coffield | A47C 7/282 |
| | | | 297/452.13 |
| 2006/0261055 A1* | 11/2006 | Child | H05B 3/342 |
| | | | 219/212 |
| 2007/0170759 A1* | 7/2007 | Nolan | B60N 2/2881 |
| | | | 297/250.1 |
| 2010/0258334 A1 | 10/2010 | Akaike et al. | |
| 2012/0156926 A1* | 6/2012 | Kato | D03D 15/587 |
| | | | 439/502 |
| 2013/0134149 A1* | 5/2013 | Weiss | H05B 3/146 |
| | | | 219/481 |
| 2014/0326708 A1* | 11/2014 | Barfuss | B60N 2/5685 |
| | | | 219/204 |
| 2015/0004372 A1 | 1/2015 | Takahashi et al. | |
| 2016/0021704 A1* | 1/2016 | Elverud | H01B 1/24 |
| | | | 219/549 |
| 2017/0013678 A1* | 1/2017 | Kiernan | H05B 3/34 |
| 2020/0015326 A1* | 1/2020 | Gerster | H05B 3/0004 |
| 2020/0323357 A1* | 10/2020 | Case | A47C 31/02 |
| 2021/0223119 A1* | 7/2021 | Moriura | G01L 1/14 |
| 2021/0291709 A1* | 9/2021 | Oomen | B60N 2/7017 |
| 2021/0315384 A1* | 10/2021 | Oomen | A47C 31/026 |

\* cited by examiner

SUSPENSION FABRIC SEAT HEATING SYSTEM

CROSS-REFERENCE TO RELATED APPLICATION DATA

This application claims the benefit of and priority to Provisional U.S. Patent Application Ser. No. 62/714,173, filed Aug. 3, 2018, titled, "SUSPENSION FABRIC SEAT HEATING SYSTEM," the entirety of which is incorporated herein by reference.

BACKGROUND

The present invention relates to suspension fabric seating and more particularly, to a suspension fabric seat heating system incorporated in the seat fabric.

Suspension or suspended fabrics have come into common use as an alternative to hard surfaces and foam padded surfaces for seating. Such suspension fabric seating surfaces can provide the comfort of foam padded surfaces in a weight similar to hard plastic seating and at relatively low cost. Advantageously, suspension fabric seating provides enhanced comfort using a preset tension in the suspension fabric that is adjustable for reaction force for comfort needs, provides tension zonally across the seating surface and is housed in a curved frame for styling character and comfort profile in reclining kinematics.

Vehicle seating, however, is typically of the foam-padded type, and is designed for comfort. Such foam-padded seating includes a steel structure and stamped components that are welded together to form a seating structure subassembly. A steel suspension layer that is below the occupant is added to bridge the distance between seat structure beams. The steel suspension offers some hammocking between structure pillars in the seat structure to enhance comfort characteristics. The foam padding, such as polyurethane (PU) covers the steel structure and suspension, and offers force vs. deflection compliance during use for occupant comfort. In a typical configuration, the foam layer is covered with a trim cover that may include leather, vinyl, and/or polyester textile fabric, a lofted fabric breathable layer and felt or a bonded layer to prevent wrinkling. These layers are used generally to for aesthetics and to manage comfort requirements as well as G-forces during a crash event.

Foam, however, has disadvantages in that although it provides comfort, it is difficult to heat. PU foams have a high R value or highly insulative properties that make it difficult to transfer heat from the vehicle cabin to the seating surface. The foams are typically also very thick 50-150 mm (about 2-6 inches) and are generally non-porous which hinders air flow from the seat environment to the occupant's skin. Heat modules are used to compensate for the R value of foam and the specific heat of seat trim covers in current automotive seats. Trim covers are, for example, leather, cloth, vinyl and the like that cover the foam cushions and add to the resistance to transfer cabin heat to the occupant.

Suspension fabric seating can be heated using a number of approaches. One known way in which such seating is by use of a blower system. Forced air that is conditioned (heated or cooled) can be funneled to blow on the back side of the fabric. The porosity of the suspension fabric allows the forced air to heat or cool the occupant skin. The forced air offers a cooling sensation to the seat user by drawing heat and humidity (by evaporative cooling) from the seat. The velocity of the air can be altered using blower modules, and air temperature through forced air devices can be conditioned to a targeted temperature to assist the heating or cooling function.

Another way in which suspension fabric seating can be heated is by use of a heating element that is sewn, welded or adhered to the back side the seat surface. This design, however, includes a barrier or distance between the occupant and the heating source creating an air gap. The air gap functions as an insulative layer, thus reducing the heating efficiency of the heating element. Reduced efficiencies require increased power to the heating element—power which is taken from the overall vehicle systems. This can be especially important with the shift toward hybrid and fully electric vehicles.

In addition, mat heaters that are attached to back side of the seat surface hinder suspension fabric stretch and limit the hammocking effect that is required for seat comfort. That is, when hammocking is restricted, comfort is reduced, adversely affecting the stretch/elongation of fabric fibers and altering the indentation force deflection (IFD) of the seat. Moreover, suspension seats with attached heater modules can create hard points or non-uniform hard locations in the suspended fabric, again, reducing occupant comfort. Further, heating element systems are costly due to the parts required and the labor needed for assembly.

Another drawback to heating element systems is that the overall aesthetics of the seat can be impacted. If the fabric is quite porous, light colored or transparent/translucent the heating element may be visible through the fabric. In addition, thermocouples and other connectors/conductors require wire harnesses that may be difficult to position, and do not support a simple contemporary aesthetic.

Accordingly, there is a need for a suspension fabric seat heating system that is incorporated in the seat fabric. Desirably, such a system permits heating the seat using less current (reduced amperage). More desirably still, such a system heats the seat close to an occupant's skin so as to provide an efficient heating scenario, resulting in shorter heating times and reduced current draw. Still more desirably, in such a system, the electronic circuit within the seat is minimally or not visible by the vehicle occupants and does not impact the suspension fabric flex so as to reduce occupant comfort.

SUMMARY

In one aspect a suspension seat includes a fabric seat surface formed from a woven fabric material with heating element fibers in the fabric. The heating element fibers are in electrical communication with a conductor. A carrier is overmolded onto the seat surface. The carrier and the conductor are disposed in a frame and a connector is in electrical communication with the conductor.

Advantageously, a suspension seat in accordance with the present disclosure includes a heating system that is incorporated in the suspension seat fabric. The system permits heating the seat using less current and heats the seat close to an occupant's skin to provide an efficient heating scenario.

In an embodiment, the heating element fibers are woven into the fabric. Alternately, the heating element fibers can be disposed on a surface of the fabric. The fabric is woven from warp fibers and weft fibers. In an embodiment, the heating element fibers are disposed alongside the warp fibers. The heating element fibers can replace some of the warp fibers. The heating element fibers may also replace some of the weft fibers.

The heating element fibers are in electrical communication with a conductor. In embodiments, the conductor can be a conductive strip and the strip is positioned in a strip socket, with the heating element fibers captured between the conductive strip and the strip socket.

A carrier is overmolded onto the seat surface. The carrier is disposed in a channel in the frame and the conductor is disposed in a channel in the frame. In an embodiment the conductor can carrier are disposed in a common channel in the frame.

In an embodiment the carrier and the conductor are overmolded onto the seat surface such that ends of the heating element fibers extend beyond a periphery of the carrier.

The carrier and conductor can be overmolded onto the seat surface such that ends of the heating element fibers extend beyond a periphery of the carrier. The seat surface and carrier are disposed in the frame and a connector is in electrical communication with the conductor.

In embodiments, the conductor is formed as part of the carrier. In an embodiment, the carrier is formed, in part by a conductive polymeric material and in another part by a non-conductive polymeric material. The fabric is disposed between the conductive and non-conductive polymeric materials. One suitable conductive polymeric material is a conductive thermoplastic material.

In an embodiment, the conductor is a powdered metal applied to the fabric. In such an embodiment, the carrier is overmolded over the fabric and the powdered metal. In another embodiment, the conductor is a conductive strip with the fabric in contact therewith. In this embodiment, the carrier is overmolded over the fabric and conductive strip. The frame can include a channel and the conductive strip can be positioned in the channel.

In an embodiment, some of the fabric is formed from monofilaments. The monofilaments can be formed from, for example, a block copolymer. The monofilaments can be the weft fiber and can provide elasticity to the seat surface to obtain a desired occupant pressure map of the seat shape making the seat more comfortable.

In an embodiment, the heating element fibers have a targeted ohm resistance to achieve a temperature of about 30° C. to about 50° C. 15. In an embodiment, the seat can include a temperature sensor. The temperature sensor can be a fiber incorporated into the seat surface.

A method for making a seat includes overmolding a carrier onto a fabric seat surface formed from a woven fabric material having heating element fibers. In a method, the heating element fibers are contacted with a conductor and the carrier and the conductor are positioned in a frame. In methods, the carrier is positioned in a channel in the frame and the conductor is positioned in a channel in the frame. In some methods the conductor and carrier are positioned in a common channel.

In some methods, ends of the heating element fibers extend beyond a periphery of the carrier and the carrier is, in part, electrically conductive. The frame is formed and the carrier is positioned in the frame.

In a method, overmolding the carrier onto the fabric is carried out in a first overmolding of a conductive polymeric material onto which the fabric is positioned and a second overmolding of a non-conductive polymeric material onto the fabric and the conductive polymeric material.

In another method overmolding the carrier onto the fabric is carried out in a first overmolding of a non-conductive polymeric material onto which the fabric having a powdered metal is positioned and a second overmolding of a non-conductive polymeric material onto the fabric, powdered metal and the conductive polymeric material.

In still another method overmolding the carrier onto the fabric includes overmolding a non-conductive polymeric material onto the fabric and a conductive strip. In methods, the frame has a channel and a conductive adhesive is disposed in the channel. The carrier is positioned on the adhesive with the ends of the heating element fibers in contact with the conductive adhesive.

The methods can all include positioning a connector on the frame in electrical connection with the conductor.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
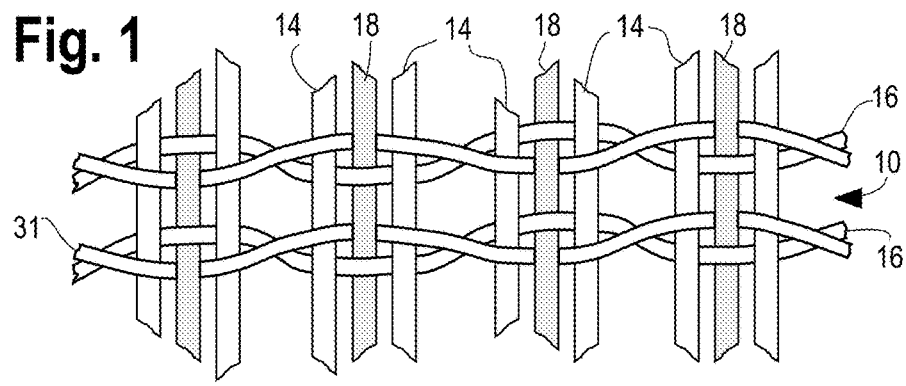
FIG. 1 is an example of a suspension seat fabric in accordance with the present disclosure.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Referring to the figures and in particular to FIG. 1, there is shown an example of a woven fabric 10 for a suspension fabric seat surface 12. The fabric 10 is woven from fibers or yarns (used interchangeably herein) and includes a series of warp fibers 14, illustrated as the vertical fibers, and weft fibers 16 illustrated as the horizontal fibers. Typically, the warp fibers 14 are fill yarns and extend in the front-to-rear direction of a seat bottom surface or a top-to-bottom direction in a seat back surface or headrest. The weft fibers 16 are typically monofilament fibers that extend in a side-to-side direction transverse to the warp fibers 14. An example of a woven fabric is disclosed in Coffield, U.S. Pat. No. 8,329,281, which patent is commonly assigned with the present application, the disclosure of which is incorporated herein in its entirety. Examples of the monofilament fibers are disclosed in Coffield, et al., U.S. Pat. No. 8,857,033 and Coffield, U.S. Pat. No. 9,156,211, which patents are commonly assigned with the present application, the disclosures of which are incorporated herein in their entirety.

The warp fibers 14 or yarns are relatively inelastic and elongate less than about 12 to 15 percent and preferably, less than about 5 percent. The warp fibers 14 give the fabric 10 bulk and thickness and are able to be colored for a colored fabric suspension assembly. The warp fibers 14 are used to shape the seat surface 12 by pulling the monofilament (weft) fibers 16 out of straight line position to form a parabolic shape in the overall suspension fabric seat surface 10. The warp fibers 14 can be formed from, for example, a polyester yarn or like, suitable materials.

The weft fibers 16 are typically elastic and can be formed from, for example, a block copolymer monofilament. These fibers 16 can be orientated and elongate more than 10 percent, and up to about 30 percent when measured on a stress strain curve. The monofilament weft fibers 16 can be oriented and conditioned (as at an elevated temperature) and can be treated zonally to obtain a desired occupant pressure map of the seat shape making the seat more comfortable.

As seen in FIG. 1, heating elements fibers or conductive wires 18 are interspersed with the warp fill fibers or yarns 14. In embodiments, the heating element fibers 18 can replace all or some of the fill yarns 14 or they can supplement the fill yarns 14. In embodiments, the heating element fibers 18 are semi-conductive with a targeted ohm resistance to achieve a temperature of about 30° C. to about 50° C. when powered. Some examples of heating element fibers 18 are coated stainless steel wire, copper, nano-tube materials such as nano-tube polyester, carbon yarns, and the like. Other suitable heating element fibers 18 will be recognized by those skilled in the art. In some embodiments, some of the weft fibers 14 may include or be replaced by or supplemented with heating element fibers 18 as well.

Figure 4:
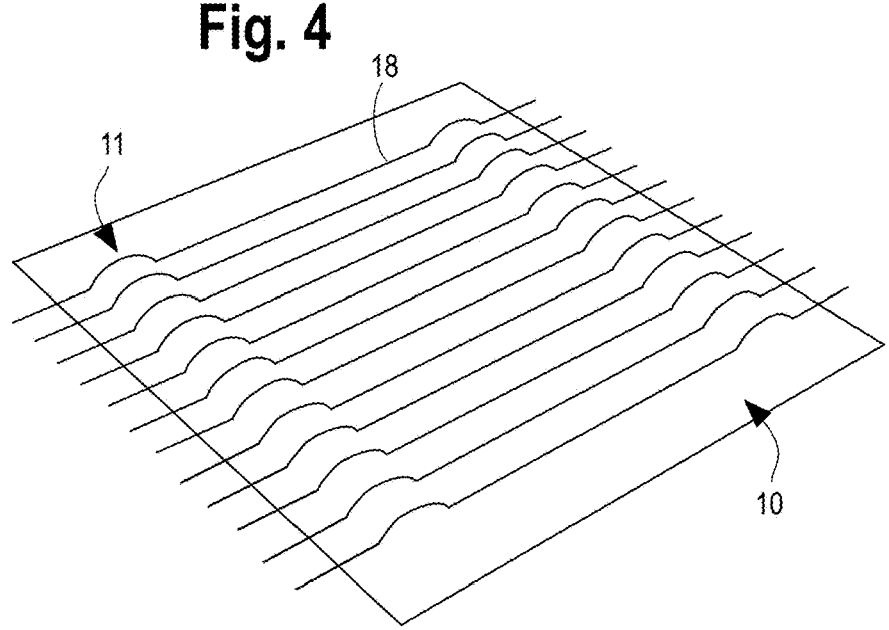
FIG. 4 is an illustration of an embodiment of a seat surface showing the heating element fibers or electrical conductive wires woven into the fabric.
Figure 5:
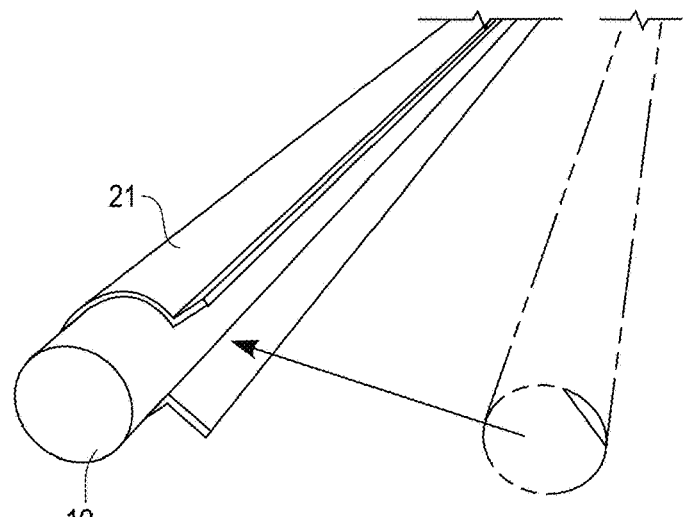
FIG. 5 illustrates a conductive strip and strip socket.
Figure 6:
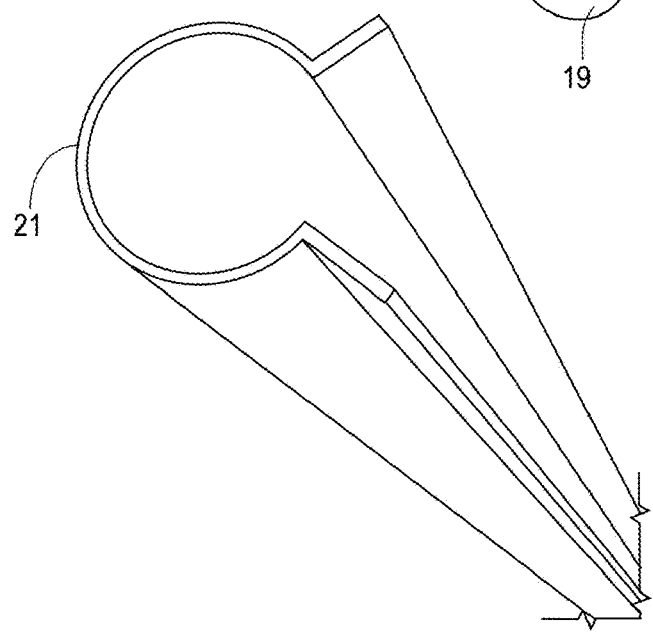
FIG. 6 is a perspective view of the strip socket.
Figure 7:
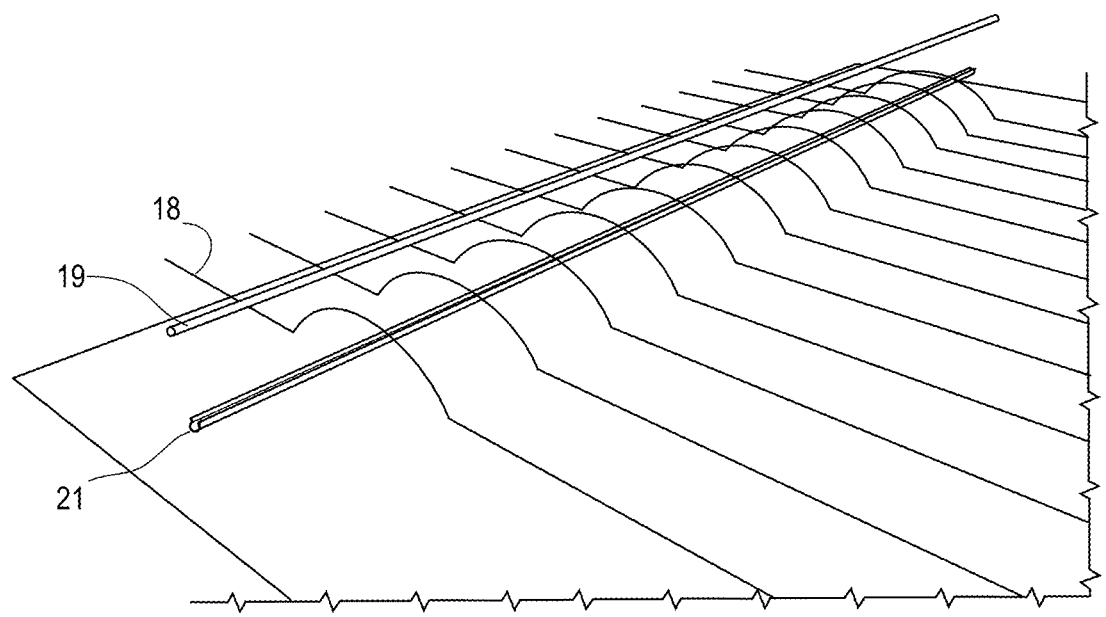
FIG. 7 shows the conductive strip and the socket in position on opposite sides of the heating element fibers.
Figure 8:
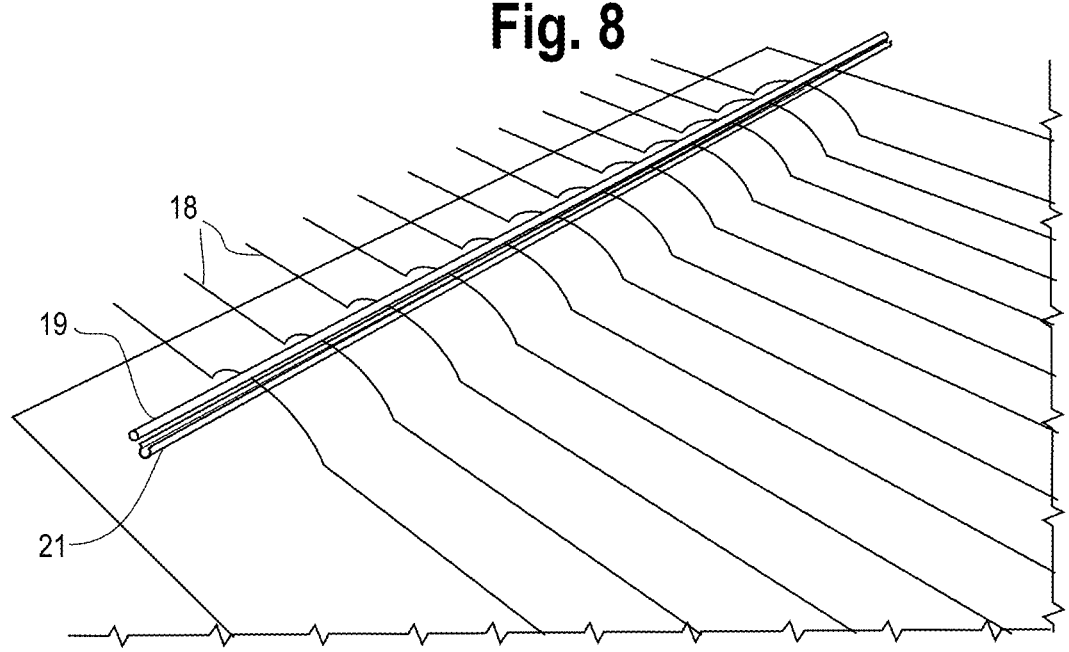
FIG. 8 illustrates the conductive strip and feed socket as the conductive strip is positioned for insertion into the strip socket with the captured heating element fibers.
Figure 9:
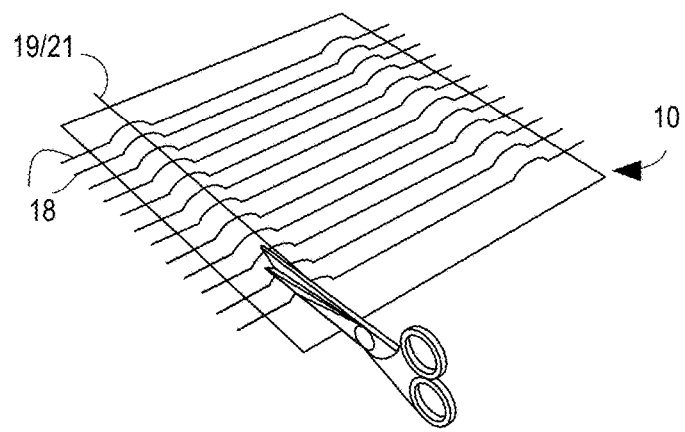
FIG. 9 illustrates trimming of the heating element fibers after the conducting strip and strip socket are engaged with the heating element fibers.

As noted above, in an embodiment, the heating element fibers 18 are woven in place of some of warp fibers or yarns so as to limit that amount of added bulk and thickness, and to reduce the visual and aesthetic impact on the seat surface 12. It will be appreciated that the heating element fibers 18 can be affixed to the bottom of the seat surface 12 as well, by, for example, stitching, adhesives and the like. In some embodiments the heating element fibers 18 can be woven into the fabric 10 having some amount of slack, as indicated at 11 in FIG. 4. As will be appreciated by those skilled in the art, the heating element fibers 18 may be formed from materials that are less elastic than either or both of the warp and weft fibers. As such, in order to allow the heating element fibers 18 to conform to the seat surface 12 as the seat surface 12 conforms to a user's body, slack 11 in the heating element fibers 18 permits such conformance while preventing overstressing or overstretching the heating element fibers 18.

Referring to FIGS. 4-10, in an embodiment, the heating element fibers 18 are secured to a conductive member 19, such as a highly conductive strip. The heating element fibers 18 can be secured to the conductive strip 19 in a wide variety of ways. For example, a coating on the heating element fibers 18 can be removed and the bare heating element fibers 18 can be soldered or otherwise adhered to the conductive strip. In an embodiment, as illustrated in FIGS. 5-8, the heating element fibers 18 can be captured between the highly conductive strip 19 and a receiving element 21 configured to receive the heating element fibers 18 and the conductive strip 19, such as the illustrated conductive strip socket 21. In such an embodiment the conductive strip 19 and the strip socket 21 can be configured, for example, roughened, to strip or remove any coating from the heating element fibers 18 as the conductive strip 19 is inserted into the strip socket 21 with the heating element fibers 18 captured therebetween. Such an arrangement serves to provide the necessary electrical contact between the heating element fibers 18 and the conductive strip 19.

The woven fabric 10 is overmolded with a carrier 22. The fabric 10 is installed into a carrier mold and the fabric 10 is overmolded with the carrier 22 material. A carrier 22 material can be, for example, a block copolymer that is chemically similar to the fabric 10 monofilaments (the weft fibers 16). This permits chemical bonding during the injection mold process. Mechanical bonding also takes place during overmolding. Preferably, the heating element fibers 18 in the fabric 10 are designed as a parallel circuit for heating efficiency and robustness.

Figure 2:
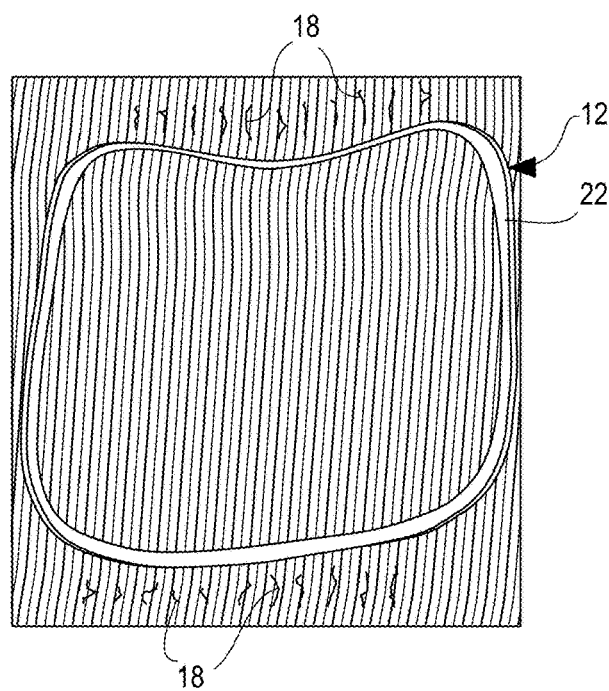
FIG. 2 illustrates an embodiment of a seat bottom surface in a seat surface carrier in accordance aspects of the present disclosure.

FIG. 2 illustrates an embodiment of a seat bottom surface 12 with a carrier 22 overmolded onto the seat surface fabric 10. In the illustrated embodiment, the seat bottom surface 12 and carrier 22 are shown with the heating element fibers 18 on either side of, and outside of the carrier 22. In an embodiment, the heating element fibers 18 are woven into the fabric 10, as illustrated in FIG. 1. In FIG. 2, the heating element fibers 18 are visible where the fibers 18 extend beyond the carrier periphery 50. The heating element fibers 18 are continuous (to both sides of the seat and into the carrier 22) to complete the electrical circuit. The heating element fibers 18 can be located in the seat surface 12 so as to minimize wear.

Figure 10:
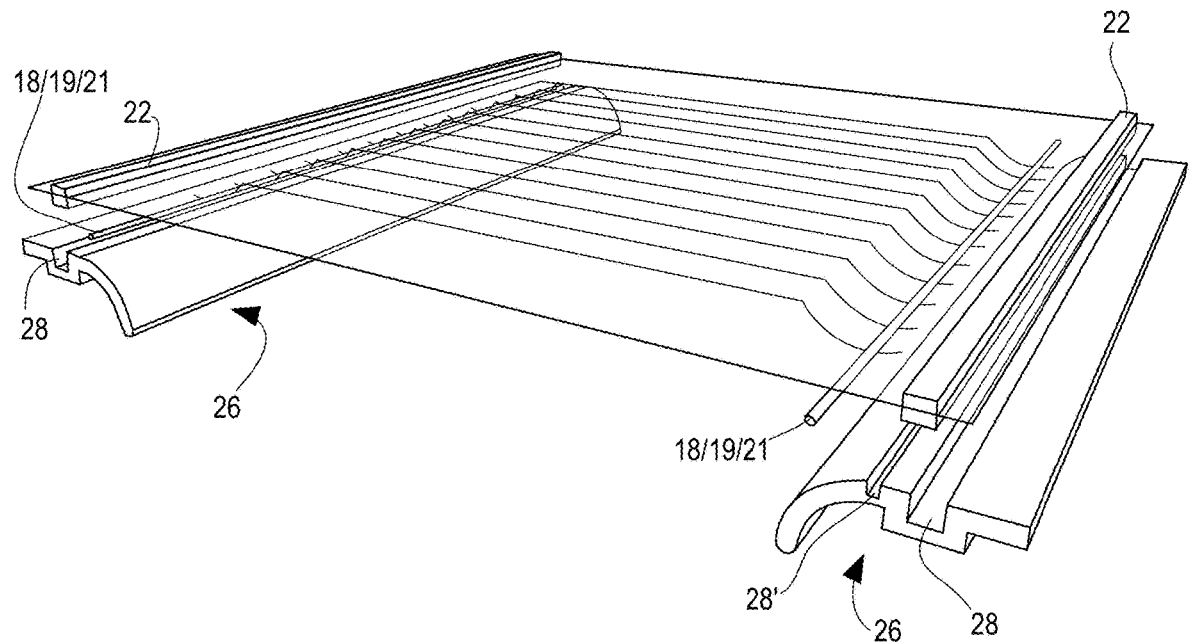
FIG. 10 illustrates two ways in which the conductive strip and strip socket (with the captured heating element fibers) can be mounted to the seat frame.

In the embodiment illustrated in FIG. 10, the heating element fibers 18 do not extend beyond, and are not molded into, the carrier 22. Rather, the heating element fibers 18 are captured and pinched between the conductive strip 19 and the strip socket 21 within the perimeter or bounds of the carrier 22.

It will be understood that some types of heating element fibers 18 may be coated fibers and that coated fibers 18, such as coated stainless steel fibers, have the coating removed so that an electrical circuit can be completed. Removal of the coating can be, for example, by burnishing the ends of the fibers 18, abrading during installation (as in the heating element fibers 18 and configuration of FIGS. 4-10), heating or other methods that will be recognized by those skilled in the art. Removing the coating exposes the conductive core of the heating element fibers 18.

Figure 3A:
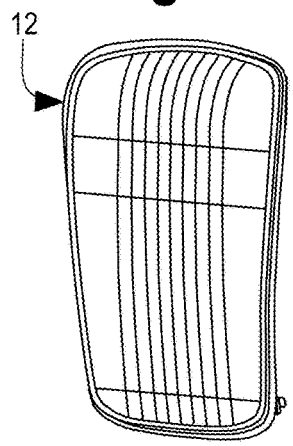
FIGS. 3A and 3B illustrate the basic construction of an embodiment of the seat bottom in an assembled view (FIG. 3A) and in an exploded view (FIG. 3B), showing the seat bottom surface in the carrier, the conductor and the seat frame.
Figure 3B:
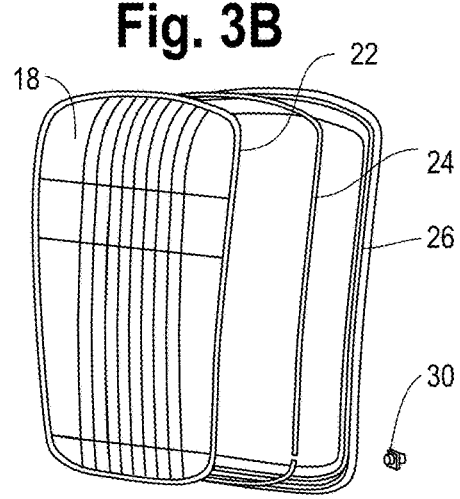
Figure 11A:
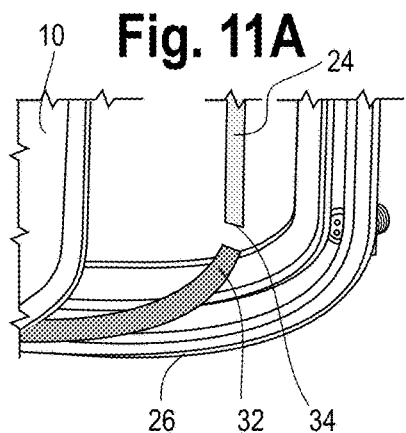
FIGS. 11A-11C are detailed views of the construction of an embodiment of the seat bottom, illustrating various routings of the conductor and an electrical connector.
Figure 11B:
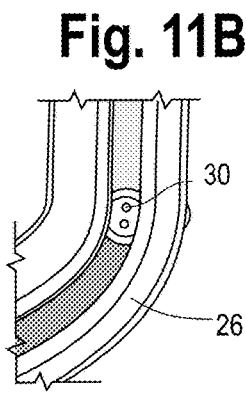
Figure 11C:
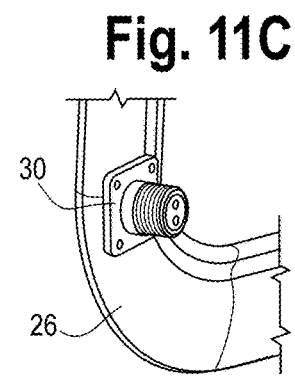

FIGS. 3A and 3B illustrate assembled and exploded views, respectively, of an embodiment of the seat surface 12 and carrier 22, the conductor 24 and the frame 26. The conductor 24 is shown as a separate component, but as described herein in connection with certain embodiments, the conductor 24 may be incorporated into the carrier 22. In an embodiment, the conductor 24 is disposed in a channel 28 formed in the frame 26. A connector 30, shown in an exploded position, is electrically connected to the conductor 24 to provide power and control to the heating elements fibers 18. FIGS. 11A-C illustrate the negative and positive sides 32, 34, respectively, of the conductor 24 as it is disposed in the channel 28 and the electrical connector 30. The connector 30 is shown in both front and rear views of the frame 26.

FIG. 10 illustrates two ways in which the seat surface 12, carrier 22 and conductor/heating element fibers (the conductive strip 19 and the strip socket 21 with the captured heating element fibers 18) can be installed in the frame 26. On the left-hand side of FIG. 10, the conductive strip 19/heating element fibers 18/strip socket 21 and the carrier 22 are installed in a common channel 28 in the frame, and both are press fit into the channel 28 in the frame 26. On the right-hand side of FIG. 10, the conductive strip 19/heating element fibers 18/strip socket 21 is installed in a conductor channel 28' in the frame 26, and the carrier 22 is installed in a carrier channel 28 in the frame 26, separate from the conductor channel 28'. The conductive strip 19/heating element fibers 18/strip socket 21 and the carrier 22 can be press fit into the channel 28/28'. Other ways in which the conductive strip 19/heating element fibers 18/strip socket 21 and carrier 22 are secured in the frame 26 will be recognized by those skilled in the art. Once installed and secured in the frame 26, electrical connection, for example, power and control can be provided to the conductive strip 19/heating element fibers 18/strip socket 21 as illustrated in FIGS. 11A-11C.

In embodiments, temperature measurement or sensing is provided in the heating system. Referring briefly again to FIG. 1, in an embodiment, a sensor, such as a temperature sensor is provided in the form of one or more fibers 31. The temperature sensor fiber 31 can be, for example, a thermocouple fiber that is incorporated into the seat surface 12, for example along with the weft or monofilament fibers 16. It will be appreciated that the temperature sensor fiber 31 can also be incorporated along with the warp fibers 14, or as another fiber. As such, the temperature sensor fiber 31 can be fabricated to have characteristics similar to those fibers 14 or 16 around which it is incorporated into the seat surface 12. The temperature sensor fiber 31 may be incorporated into the seat heating system along with a switch to provide, isolate or vary power to the heating element fibers 18. Other sensors for temperature measurement may also be used, which other sensors are within the scope and spirit of the present disclosure. It is contemplated that the heating element fibers 18 can be individually controlled or monitored, or can be controlled in groups as well as being controlled as one.

FIGS. 12A-12D illustrate various examples of ways in which the heating element fibers 18 as positioned in and extending through the carrier 22, can be electrically connected to the connector 30, through the frame 26.

Figure 12A:
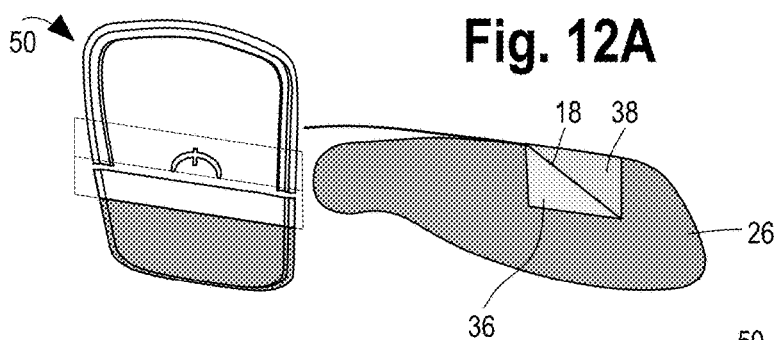
FIGS. 12A-12D show various examples of constructions of the heating element fibers in the seat frame.

FIG. 12A illustrates a conductor 24 that uses a conductive thermoplastic 36 to which the heating element fiber 18 ends are connected. In an embodiment, the conductive thermoplastic 36 is part of the carrier 22 overmold. That is, a first shot or application of the carrier 22 overmold material is the conductive thermoplastic 36 with the exposed fibers 18 laid into the conductive thermoplastic 36. A second shot of a non-conductive thermoplastic 38 is molded over the fiber 18 ends and the conductive thermoplastic 36 to seal the fiber 18 ends and form a seat surface/carrier assembly 48. The seat surface/carrier assembly 48 is then positioned in the frame channel 28.

Figure 12B:
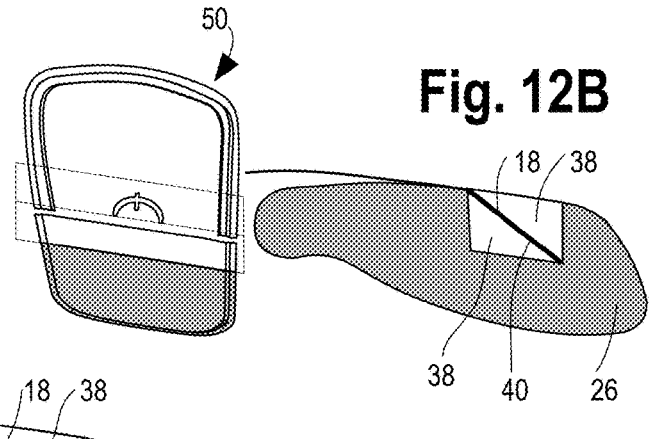

In FIG. 12B, a powdered metal 40 is applied to the fabric 10 and the carrier 22 is overmolded onto the fabric 10 and the powdered metal 40. The powdered metal 40 bridges the spaces between the fibers 18, and the injection pressure during the carrier 22 overmolding wets out the powdered metal 40 to form the conductor 24. The seat surface/carrier assembly 48 is then positioned in the frame channel 28.

Figure 12C:
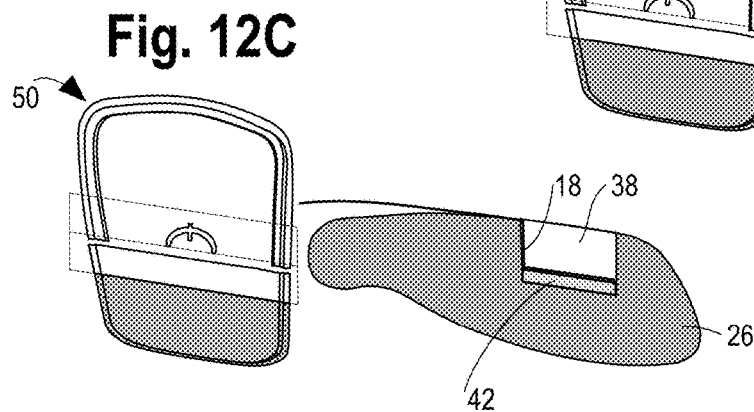

In FIG. 12C, a conductive foil element 42, such as a metal foil strip is positioned in the carrier mold tool prior to positioning the fabric 10 in the mold tool. The carrier 22 overmolding presses the foil 42 on to the heating element fiber 18 ends to form the conductor 24, and the seat surface/carrier assembly 48 is then positioned in the frame channel 28.

Figure 12D:
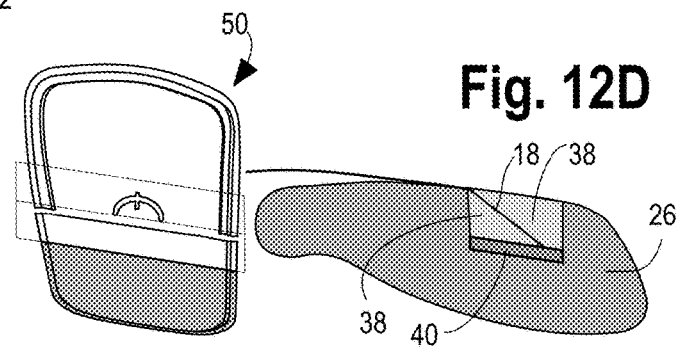

In FIG. 12D, a conductive adhesive 44 is used. In this embodiment the conductive adhesive 44, such as a conductive epoxy which can be applied, for example, in strip form, is positioned in the carrier tool before the fabric 10 is loaded. In the molding process, the injected carrier resin flows over the heating element fiber 18 ends and the adhesive 44, and the injection pressure and resin heat cure the adhesive 44 and wet out onto heating element fiber 18 ends and the fabric 10 to form the conductor 24. Other suitable conductive adhesives 44 will be recognized by those skilled in the art.

It will be appreciated that in each of the embodiments disclosed, the conductor 24, whether separate from or formed as part of the carrier 22, is reliably electrically attached to each of the heating element fibers 18 across the entirety of the seat surface 12. It is anticipated that about 2 to 30 yarns, spaced about 10 to 30 mm apart will provide the desired level of heating. The carrier 22 overmold holds the fabric 10 in tension, and also conceals the conductive path, e.g., the conductor 24, from the heating element fibers 18 up to termination at the electrical terminal connector 30.

Figure 13:
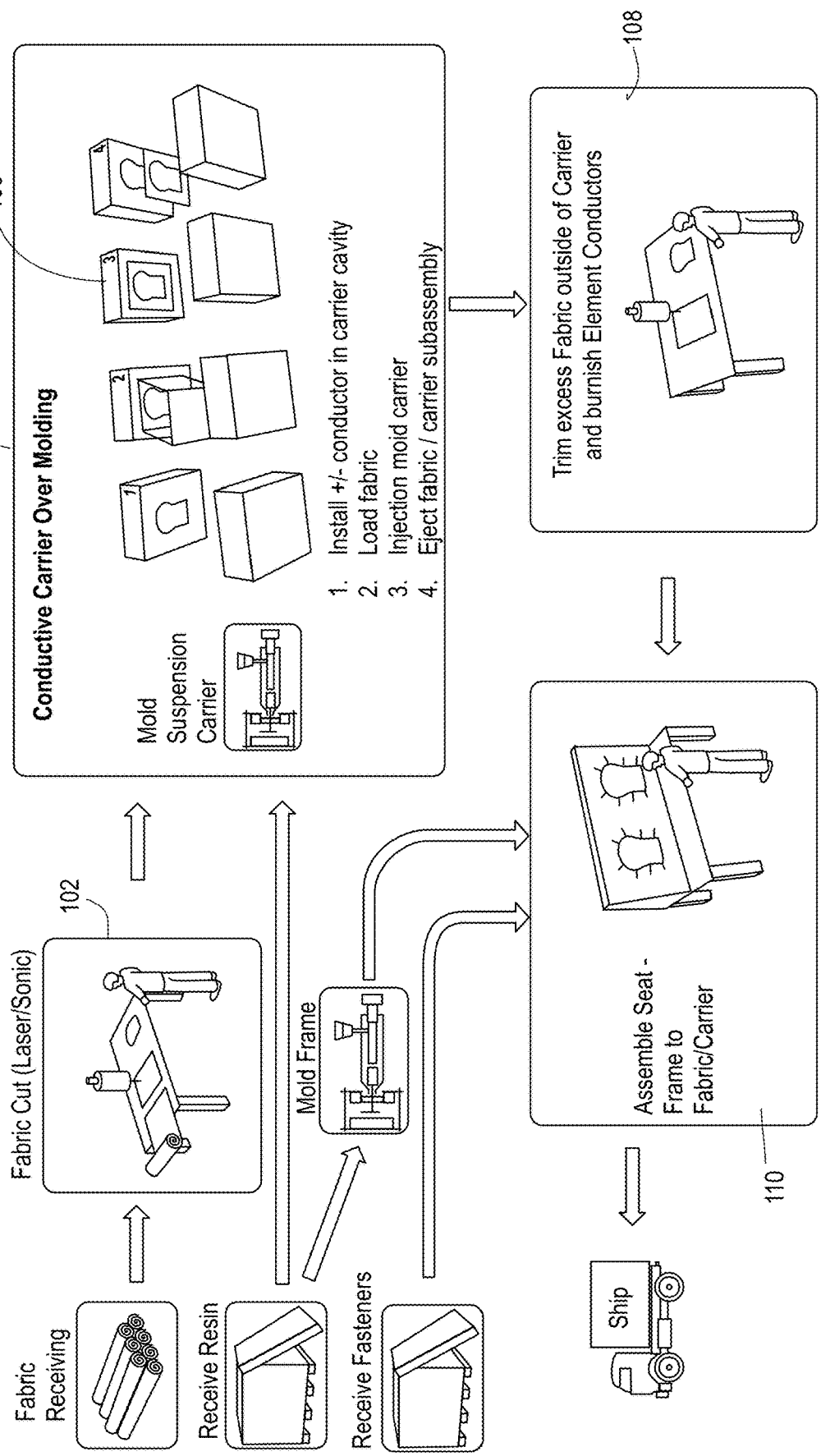
FIG. 13 is a flow diagram of a method for fabricating the suspension fabric seat and heating system in accordance with the present disclosure.

One method 100 for making the suspension fabric seat heating system is illustrated in FIG. 13, and includes, at step 102, cutting a woven fabric 10 as needed and positioning the woven fabric 10 (with the heating element fibers 18 in the fabric 10) in a carrier 22 mold at step 104. The carrier 22 is overmolded onto the fabric 10 at step 106 with a block copolymer or other suitable polymeric material. Preferably, the carrier overmold material is chemically similar to the fabric monofilaments (for example, the weft fibers 16) so that chemical, as well as mechanical bonding occurs during the injection molding process.

In a method, the carrier 22 overmold is carried out in a two shot or two application process. In a first shot, the overmold material is a conductive thermoplastic 36. The fabric 10 with the heating element fibers 18 is then laid onto the conductive thermoplastic 36 and a second shot of a non-conductive thermoplastic 38 is laid over the fabric 10 and the conductive thermoplastic 36.

In another method, the carrier 22 overmold is also carried out in a two shot or two application process. In a first shot, the overmold material is a non-conductive thermoplastic 38. A powdered metal 40 is applied to the fabric 10 and the fabric 10 and powdered metal 40 are laid onto the non-conductive thermoplastic 38. A second shot of non-conductive thermoplastic 38 is laid over the fabric 10 and metal 40, and the first shot of non-conductive thermoplastic 38.

In still another method, the carrier 22 overmold is carried out in a one shot or application process. A conductive element 42, such as a metal foil or strip is positioned in the overmold tool, and the fabric 10, with the heating element fibers 18 is laid onto the element 42. A non-conductive thermoplastic 28 is laid over the fabric 10 and the element 42.

In yet another method, the carrier 22 overmold is carried out in a two shot or two application process with the fabric 10 sandwiched between two applications of non-conductive thermoplastic 38 to form the carrier 22. The heat element fiber 18 ends are exposed beyond the carrier outer periphery 50. A conductive adhesive 44 is applied to an outer surface of the carrier 22 or the bottom of the frame channel 28 so as to make contact with the heat element fiber 18 exposed ends.

Once the fabric or seat surface/carrier assembly 48 is formed, in a post processing step at step 108, any insulative coating is removed from the heating element fibers 18 outside of the overmolded fabric/carrier assembly 48. The insulative coating, if present, can be removed by burnishing, heating or other suitable methods to expose the conductive core of the heating element fibers 18. If necessary, the carrier 22 and fabric 10 can be trimmed to remove excess polymer beyond the carrier outer periphery 50 for better quality and fit into the frame 26. In some methods, a small amount of fabric 10 with the exposed heating element fiber 18 ends remains beyond the carrier outer periphery 50.

The frame 26 is molded so as to receive the seat surface/carrier assembly 48. In embodiments, the frame 26 is with the channel 28 and, depending upon which configuration of fabric/carrier assembly 48 is used, the conductor 24 may be applied or installed in the channel 28, preferably in the bottom of the channel 28, or the fabric/carrier assembly 48 which incorporates the conductor 24, is installed directly into the channel 28, as at step 110.

In a method, the burnished ends of the heating element fiber 18 are folded over the carrier 22 to expose the conductive fibers to the conductor 24, as needed, and the fabric/carrier assembly 48 is installed into the frame.

In still another method for making the suspension fabric seat heating system, the fabric 10 is woven (with the heating element fibers 18 in the fabric 10) such that the heating element fibers 18 do not extend to the edges of the fabric 10. The heating element fibers 18 may be woven into the fabric 10 with some slack. The heating element fibers 18 are captured between a conductive strip 19 and a strip receiver 21, such as the illustrated strip socket, on either side of the fabric 10. The carrier 22 is overmolded onto the fabric 10 outside of the conductive strip 19 and a strip receiver 21 with, for example, a block copolymer or other suitable polymeric material. Preferably, the carrier overmold material is chemically similar to the fabric monofilaments (for example, the weft fibers 16) so that chemical, as well as mechanical bonding occurs during the injection molding process.

The carrier 22, and the conductive strip 19 and strip receiver 21 with the captured heating element fibers 18, are then installed in the channel 28 in the frame 26. The conductive strip 19/strip receiver 21/captured heating element fibers 18 and the carrier 22 can be installed in common channels 28 or the conductive strip 19/strip receiver 21/captured heating element fibers 18 can be installed in one channel 28' and the carrier in another channel 28.

Because the channel 28 or 28' navigates around the frame 26 perimeter and terminates at the connector 30, preferably at a location hidden from occupant view and near the vehicle wire harness and wire harness terminal connector, there are few if any visible components to detract from the aesthetics of the seat. In addition, the configuration in which the conductive strip 19/strip receiver 21/captured heating element fibers 18 do not extend to and into the carrier, the channel 28 or 28' can serve as a protective zone of the seat, free of occupant induced stresses and enhancing circuit robustness and the life span of the electronics.

The molded in electrical connector 30 ensures easy installation of power for the electrical circuit, and maintains a discrete appearance hidden from view within the seat frame assembly. The present configuration is sufficiently robust to withstand repeated loading by vehicle seat occupants.

In the present disclosure, the words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

The invention claimed is:

1. A seat, comprising:
    a fabric seat surface formed from a woven fabric material, the fabric having heating element fibers, the heating element fibers in electrical communication with a conductor;
    an overmolded carrier that is coupled to the fabric material;
    a frame defining a channel, wherein at least one the carrier and the conductor is attachingly fitted within the channel and holds the fabric material in tension on the frame; and
    a connector in electrical communication with the conductor.

2. The seat of claim 1, wherein the heating element fibers are woven into the fabric.

3. The seat of claim 2, wherein the heating element fibers are woven into the fabric to define regions of slack in the heating element fibers.

4. The seat of claim 2, wherein the fabric is woven from warp fibers and weft fibers and wherein the heating element fibers are disposed alongside the warp fibers.

5. The seat of claim 1, wherein the carrier is disposed in the channel in the frame.

6. The seat of claim 1, wherein the conductor is disposed in the channel in the frame.

7. The seat of claim 5, wherein the conductor is disposed in the channel.

8. The seat of claim 1, wherein the conductor is a conductive strip.

9. The seat of claim 8, wherein the strip is positioned in a strip socket, and wherein the heating element fibers are captured between the conductive strip and the strip socket.

10. The seat of claim 8, wherein the carrier and the conductor are overmolded onto the seat surface such that ends of the heating element fibers extend beyond a periphery of the carrier.

11. The seat of claim 1, wherein the carrier is formed in part by a conductive polymeric material and in another part by a non-conductive polymeric material, the fabric being disposed between the conductive polymeric material and the non-conductive polymeric material, and wherein the heating element fibers extend into the carrier.

12. The seat of claim 1, wherein some of the fabric is formed from monofilaments.

13. The seat of claim 12, wherein the monofilaments are formed from a block copolymer.

14. The seat of claim 1, wherein the heating element fibers have a targeted ohm resistance to achieve a temperature of about 30° C. to about 50° C.

15. The seat of claim 1, including a temperature sensor.

16. The seat of claim 15, wherein the temperature sensor is a fiber incorporated into the seat surface.

17. A seat, comprising:
a fabric seat surface defined by a woven fabric material, the fabric material comprising heating element fibers,
a frame defining at least one channel;
an overmolded carrier that is coupled to the fabric material and holds the fabric material in tension on the frame; and
a connector in electrical communication with a conductor,
wherein the heating element fibers are electrically coupled with the conductor,
wherein the carrier and the conductor are both at least partially disposed within the at least one channel of the frame, and
wherein at least one of the conductor and the carrier is press fitted into the channel to hold the fabric material in tension.

18. The seat of claim 17, wherein the heating element fibers are disposed between the conductor and a receiving element.

19. A seat, comprising:
a fabric seat surface formed from a woven fabric material, the fabric having heating element fibers and temperature sensor fibers,
a frame including at least one channel;
an overmolded carrier that is coupled to the fabric material and holds the fabric material in tension on the frame; and
a connector in electrical communication with a conductor,
wherein the heating element fibers and the temperature sensor fibers are in electrical communication with the conductor,
wherein the heating element fibers are held in place against the frame with the conductor, and
wherein at least one of the conductor and the carrier is press fitted into the channel to hold the fabric material in tension.

20. The seat of claim 19 further including a switch that is electrically coupled with the heating element fibers, and
wherein the temperature sensor fibers are configured to provide a signal to vary the temperature of the heating element fibers based on a temperature measured by the temperature sensor fibers.

* * * * *